United States Patent
Garzon et al.

(10) Patent No.: US 8,730,607 B1
(45) Date of Patent: May 20, 2014

(54) THERMOELECTRIC VOLTAGE-BASED DIFFERENTIAL CONTACT SENSOR

(71) Applicant: HGST Netherlands B.V., Amsterdam (NL)

(72) Inventors: Samir Garzon, Sunnyvale, CA (US);
John Contreras, Palo Alto, CA (US);
Lidu Huang, Danville, CA (US);
Gurinder Singh, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/691,492

(22) Filed: Nov. 30, 2012

(51) Int. Cl.
*G11B 5/02* (2006.01)

(52) U.S. Cl.
USPC .................. 360/59; 360/55; 360/64; 360/75

(58) Field of Classification Search
None
See application file for complete search history.

(56) References Cited

U.S. PATENT DOCUMENTS

| | | | |
|---|---|---|---|
| 6,067,203 A | 5/2000 | Ottesen et al. | |
| 6,181,520 B1 | 1/2001 | Fukuda | |
| 6,239,951 B1 | 5/2001 | Wang et al. | |
| 6,486,660 B1 | 11/2002 | Luse et al. | |
| 6,907,322 B2 * | 6/2005 | Ghoshal | 360/55 |
| 6,999,265 B1 | 2/2006 | Schreck et al. | |
| 7,177,782 B2 | 2/2007 | Falik et al. | |
| 7,233,459 B2 | 6/2007 | Zhu | |
| 7,262,936 B2 * | 8/2007 | Hamann et al. | 360/128 |
| 7,312,941 B2 | 12/2007 | Hirano et al. | |
| 7,450,333 B2 | 11/2008 | Hirano et al. | |
| 7,477,470 B2 | 1/2009 | Leis et al. | |
| 7,589,928 B2 | 9/2009 | Roy et al. | |
| 7,719,786 B1 | 5/2010 | Baumgart et al. | |
| 7,796,356 B1 | 9/2010 | Fowler et al. | |
| 7,800,858 B1 | 9/2010 | Bajikar et al. | |
| 7,808,741 B2 | 10/2010 | Matsumoto et al. | |
| 7,936,538 B1 | 5/2011 | Zhang et al. | |
| 7,952,837 B1 | 5/2011 | Dobosz et al. | |
| 7,969,685 B2 | 6/2011 | Shen et al. | |
| 2005/0174665 A1 | 8/2005 | Zhang et al. | |
| 2005/0270684 A1 | 12/2005 | Baumgart et al. | |
| 2008/0247095 A1 | 10/2008 | Kim et al. | |
| 2010/0027154 A1 | 2/2010 | Sonoda | |
| 2010/0073795 A1 | 3/2010 | Amano | |
| 2011/0069408 A1 | 3/2011 | Kurita et al. | |
| 2011/0157736 A1 | 6/2011 | Contreras et al. | |

(Continued)

OTHER PUBLICATIONS

E. Schreck, R.E. Fontana, Jr., A ND G. P. Singh, Thin Film Thermocouple Sensors for Measurement of Contact Temperature During Slider Asperity Interaction on Magnetic Recording Disks, IEEE Transactions on Magnetics, vol. 28., No. 5, Sep. 1992, pp. 2548-2550.

(Continued)

*Primary Examiner* — Muhammad N Edun
(74) *Attorney, Agent, or Firm* — Brokaw Patent Law PC; Christopher J. Brokaw

(57) ABSTRACT

Approaches for a hard-disk drive (HDD) comprising a head slider comprising a thermoelectric embedded contact sensor. The thermoelectric embedded contact sensor may comprise a first and second conductive lead and a metallic component. The metallic component has a different Seebeck coefficient than the first and second conductive leads. A thermoelectric voltage across the metallic component is used to measure the distance between a head slider and a magnetic-recording disk without supplying an electrical current from a hard-disk drive to either of the first conductive lead or the second conductive lead.

16 Claims, 11 Drawing Sheets

(56) References Cited

U.S. PATENT DOCUMENTS

2011/0157740 A1    6/2011    Baumgart et al.
2012/0120522 A1    5/2012    Johnson et al.
2013/0050867 A1*    2/2013    Yamane et al. ................. 360/59

OTHER PUBLICATIONS

EPCOS, "NTC Thermistors", Application Notes, EPCOS AG 2009, 9 pages, Feb. 2009.

* cited by examiner

THERMOELECTRIC VOLTAGE-BASED DIFFERENTIAL CONTACT SENSOR

RELATED APPLICATION DATA

This application is related to U.S. patent application Ser. No. 13/333,518, entitled "Balanced Embedded Contact Sensor with Low Noise Architecture," invented by Samir Garzon et al., filed on Dec. 21, 2011, the disclosure of which is incorporated by reference in its entirety for all purposes as if fully set forth herein.

This application is related to U.S. patent application Ser. No. 13/333,565, entitled "Distributed Temperature Detector Architecture for Head Disk Interface Systems," invented by John Contreras et al., filed on Dec. 21, 2011, the disclosure of which is incorporated by reference in its entirety for all purposes as if fully set forth herein.

This application is related to U.S. patent application Ser. No. 10/691,752, Patent Publication No., 2005/0088772, entitled "Magnetic Recording Disk Drive with Actively Controlled Electric Potential at the Head/Disk Interface for Wear and Durability Control," invented by Peter Michael Baumgart et al., filed on Oct. 22, 2003, the disclosure of which is incorporated by reference in its entirety for all purposes as if fully set forth herein.

FIELD OF THE INVENTION

Embodiments of the invention relate to a thermoelectric voltage-based differential contact sensor for use in a head disk interface system of a hard-disk drive (HDD).

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. An actuator relies on suspension's force on the read/write head to provide the proper distance between the read/write head and the surface of the magnetic-recording disk while the magnetic-recording disk rotates. A read/write head therefore is said to "fly" over the surface of the magnetic-recording disk. When the magnetic-recording disk stops spinning, a read/write head must either "land" or be pulled away onto a mechanical landing ramp from the disk surface.

Resistor temperature detector (RTD) architectures have been used in the prior art to determine when the read/write head makes physical contact with the magnetic-recording disk based upon the temperature of the read/write head. RTD architectures in the prior art have been implemented using a single temperature sensor that measures temperature based on the amount of voltage across a single temperature sensor. However, prior art approaches exhibit an unsatisfactory amount of noise, which complicates accurate measurements.

SUMMARY OF THE INVENTION

U.S. patent application Ser. No. 13/333,518 (the 518 application) describes an approach for a balanced embedded contact sensor (bECS) for a head-disk interface (HDI) system. A balanced embedded contact sensor of the 518 application may be implemented by a resistive temperature detector (RTD) that is comprised within a head slider. This RTD is located on an arm of a bridge circuit which has another arm that includes a balanced resistor that is located within the read/write integrated circuit (IC). The balanced resistor is configured to have the same resistance as the RTD in the head slider except when the head slider is in physical contact with the magnetic-recording disk. The bridge circuit of an embodiment allows the affect of noise generated at the head slider to be cancelled at the read/write integrated circuit (IC). As a result, accurate temperature measurements of the head slider may be obtained, thereby enabling embodiments to detect physical contact between the head slider and the magnetic-recording disk with greater precision than prior approaches.

Embodiments of the invention are directed towards a different approach for implementing a contact sensor for a head-disk interface (HDI) system than the 518 application. Embodiments of the invention do not use a resistive temperature detector (RTD), but instead, uses a sensor (a thermoelectric voltage-based differential contact sensor) that uses the Seebeck effect (thermoelectric) voltage to measure the temperature difference between two points of the slider without requiring any applied current or voltage. Use of a thermoelectric voltage-based differential contact sensor allows sensor protrusion to be avoided and allows for a low-noise measurement architecture. In addition, the thermoelectric voltage-based differential contact sensor of an embodiment combines the improved temperature cancellation from dECS as discussed in U.S. patent application Ser. No. 13/333,565 (the 565 application) with the Interface Voltage Control (IVC) compatibility of bECS as discussed in the 518 application. Also, the sensor of an embodiment may be used to provide both average temperature and head-disk spacing information by using the proposed electrical architecture.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a thermoelectric voltage-based differential contact sensor (tECS) for use in a head disk interface system of a hard-disk drive (HDD) are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
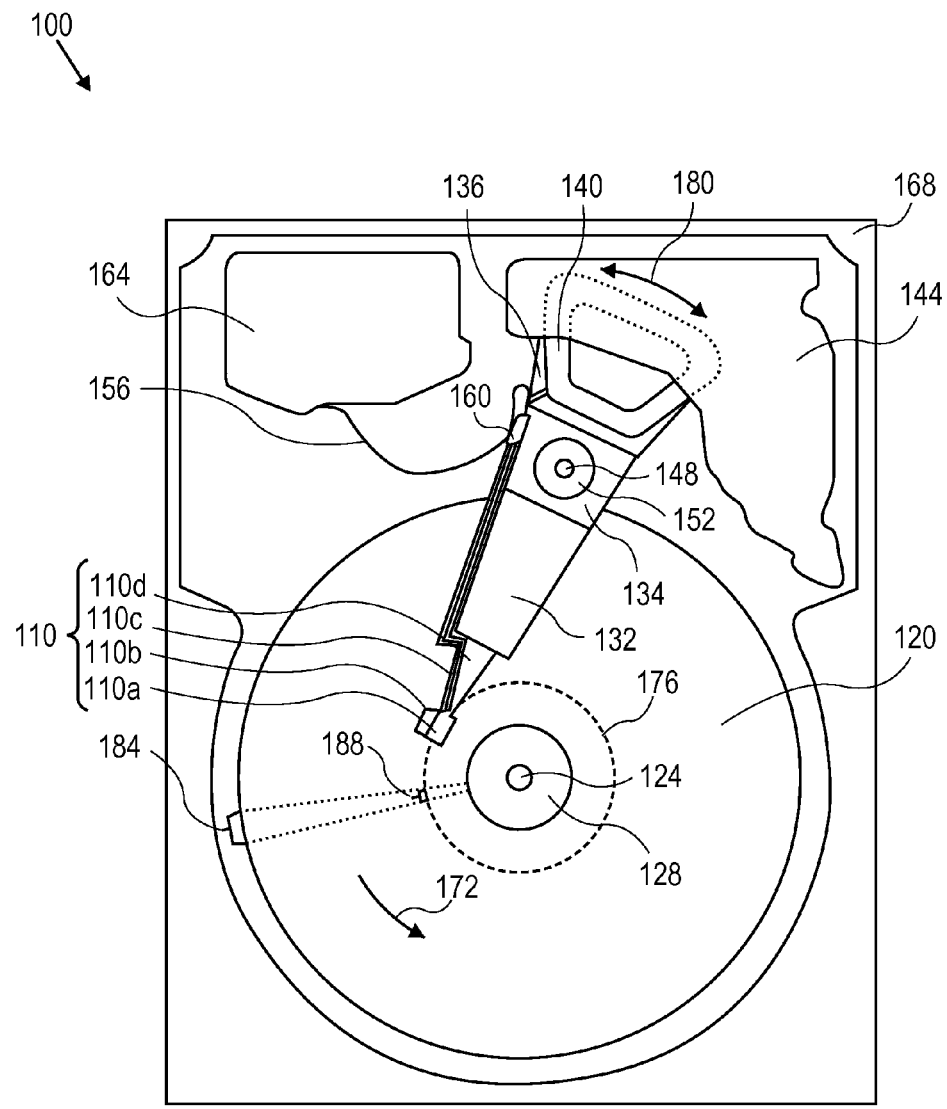
FIG. 1 is a plan view of an HDD according to an embodiment of the invention.

Embodiments of the invention may be used to detect when the head slider makes physical contact with the magnetic-recording disk. Embodiments of the invention may be incorporated with a hard-disk drive (HDD). In accordance with an embodiment of the invention, a plan view of a HDD 100 is shown in FIG. 1. FIG. 1 illustrates the functional arrangement of components of the HDD including a slider 110b that includes a magnetic-reading/recording head 110a. Collectively, slider 110B and head 110a may be referred to as a head slider. The HDD 100 includes at least one head gimbal assembly (HGA) 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110b including the head 110a.

Figure 2:
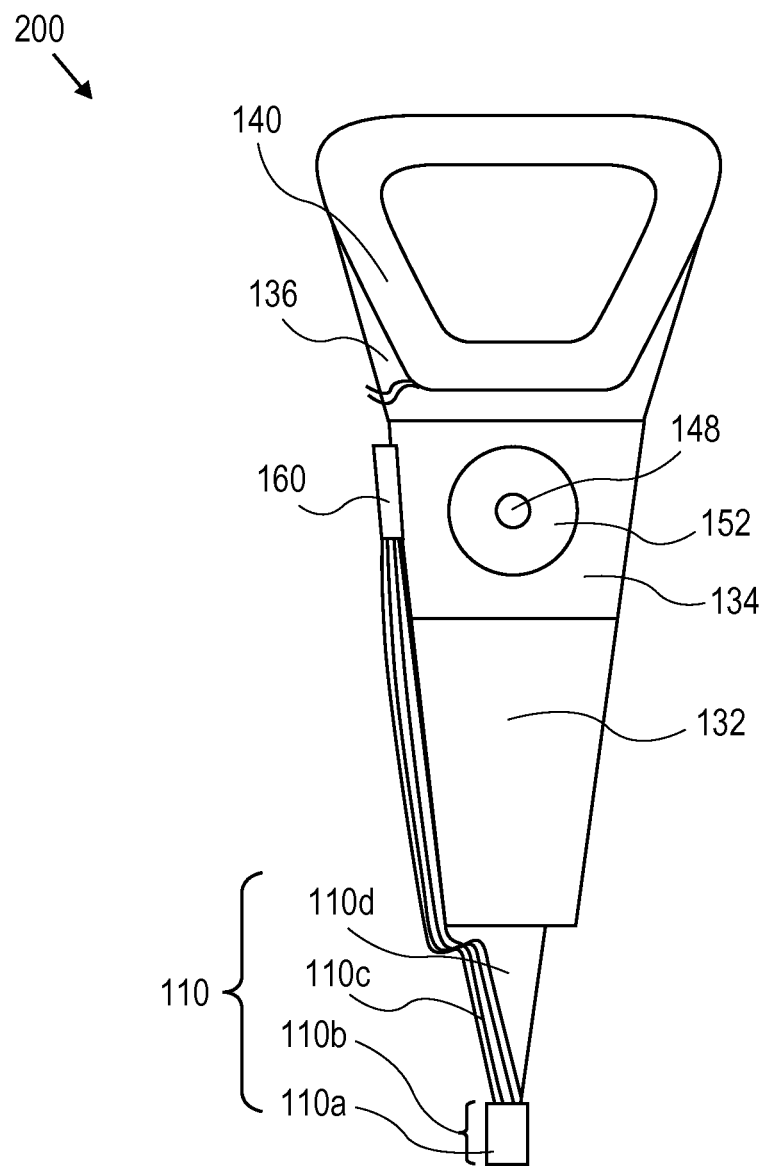
FIG. 2 is a plan view of a head-arm-assembly (HAA) according to an embodiment of the invention.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Figure 3:
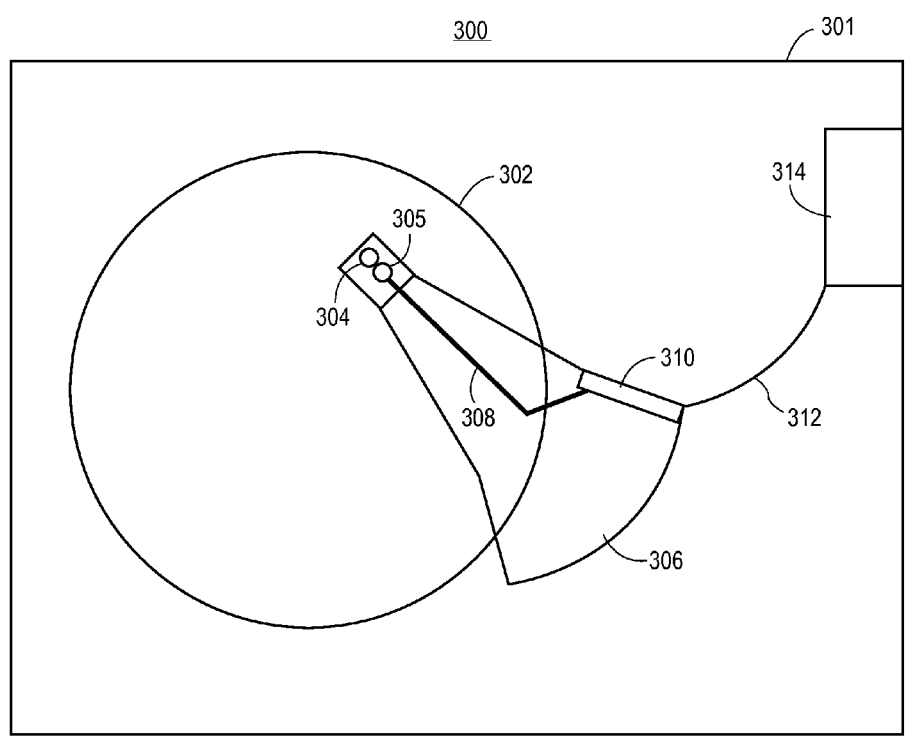
FIG. 3 is an illustration of a read/write circuit within an HDD according to an embodiment of the invention.

FIG. 3 is an illustration of a read/write circuit 310 within an HDD according to an embodiment of the invention. FIG. 3 depicts hard-disk drive (HDD) 300 which includes enclosure 301 that contains one or more magnetic platters or disks 302, read elements 304, write elements 305, an actuator arm suspension 306, a transmission line interconnect 308, a read/write integrated circuit (IC) 310, a flexible interconnect cable 312, and a disk enclosure connector 314.

Electrical signals are communicated between the read/write elements and read/write integrated circuit 310 over transmission line interconnect 308. Read/write integrated circuit 310 conditions the electrical signals so that they can drive write element 305 during writing and amplifies the electrical signal from read element 304 during reading. Signals are communicated between read/write integrated circuit 310 and disk enclosure connector 314 over flexible cable 312. Disk enclosure connector 314 conducts signals with circuitry external to disk enclosure 301. In other embodiments, read/write integrated circuit (IC) 310 is located elsewhere than depicted in FIG. 3, such as on flex cable 312 or on printed circuit board (PCB) within the hard-disk drive.

Balanced Embedded Contact Sensor (bECS)

Figure 4:
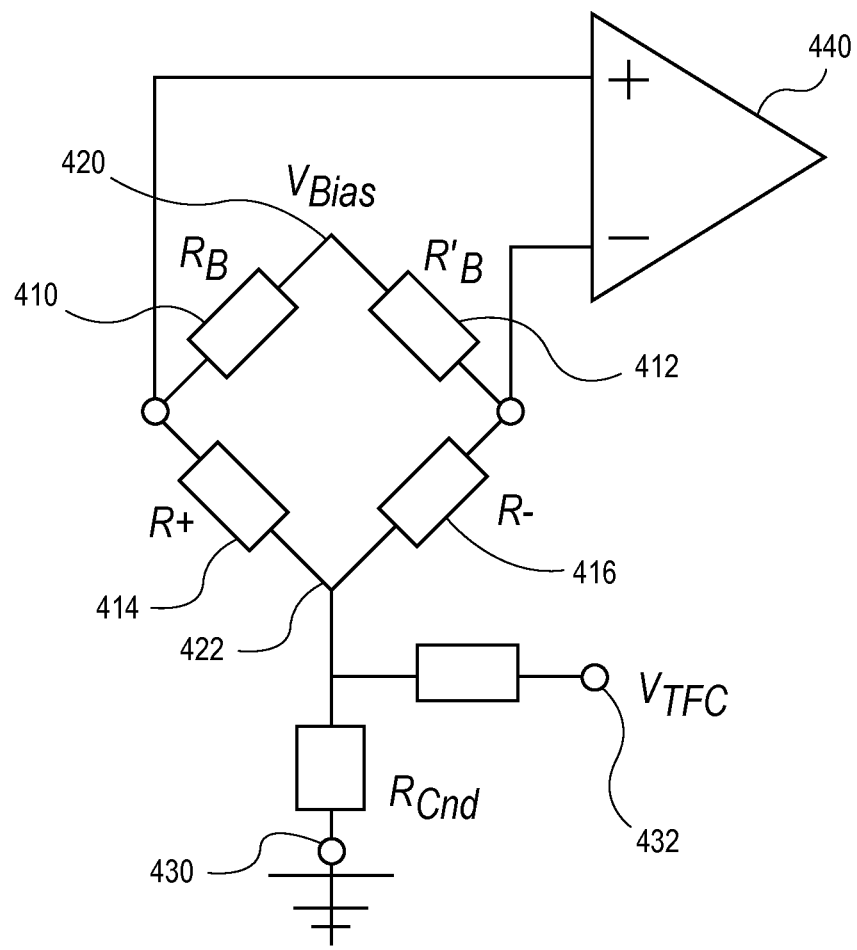
FIG. 4 is an illustration of a Wheatstone bridge bias and detection circuit employed by embodiments of the invention.

FIG. 4 is an illustration of a Wheatstone bridge bias and detection circuit 400. The circuit of FIG. 4 will be discussed below to illustrate certain operational principles employed of embodiments. In FIG. 4, tunable bias resistors 410 and 412 have resistances values of $R_B$ and $R'_B$ respectively, while resistive temperature detectors (RTDs) 414 and 416 have resistances values of $R_+$ and $R_-$ respectively. The resistance of each of $R_B$ and $R'_B$ is much larger than the resistance of $R_+$ or $R_-$.

A common voltage $V_{Bias}$ is applied to tunable bias resistors 410 and 412 at source 420 to current bias resistive temperature detectors (RTDs) 414 and 416. Current will flow to ground 430 through shared terminal 422 of RTDs 414 and 416. Shared terminal 422 is also coupled to TFC ground 432. In this configuration, noise from voltage source 420 is common mode and is not sensed by differential amplifier 440, which provides immunity to external noise. In addition, the noise from tunable bias resistors 410 and 412 are negligible (factors of $R_+/R_B$ and $R_-/R'_B$ smaller than the thermal noise from $R_+$ and $R_-$). Therefore, the system noise may be given by the thermal noise as expressed by $4 k_B T (R_+ + R_-)$ plus noise from amplifier 440.

Figure 5:
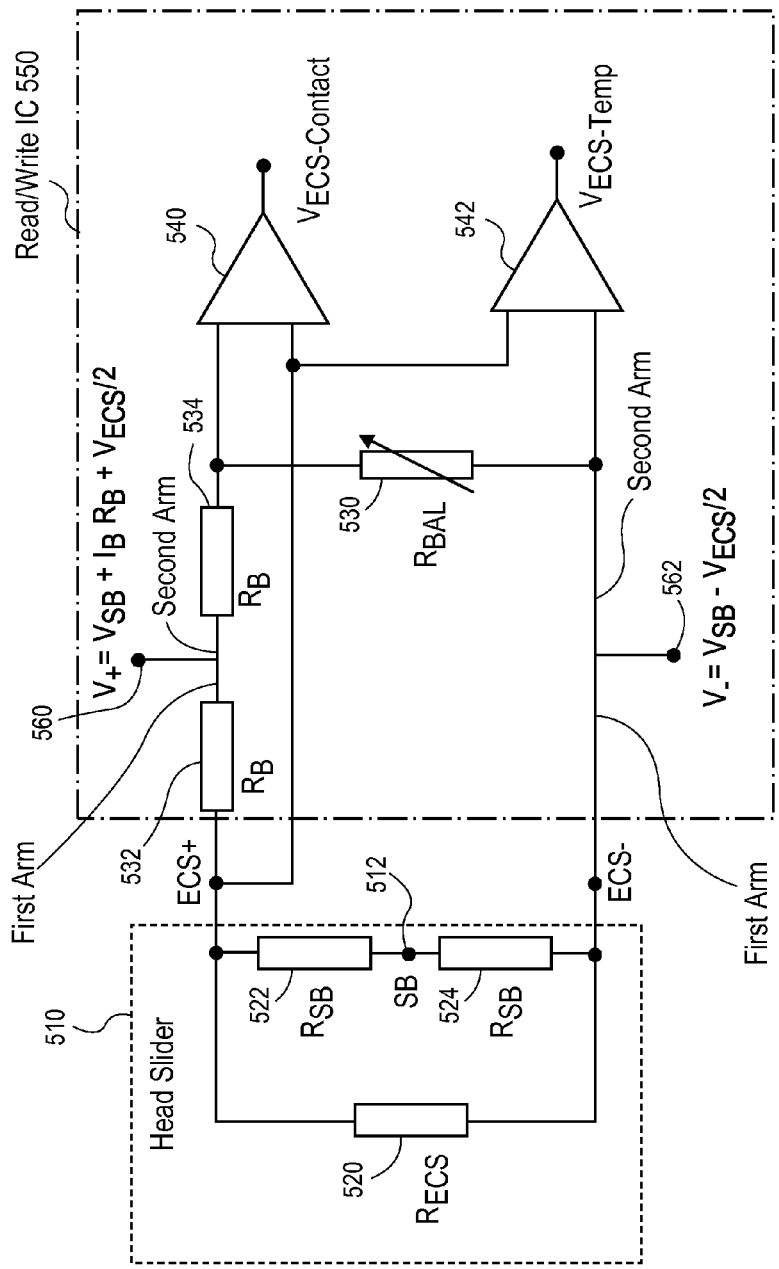
FIG. 5 is an illustration of a balanced embedded contact sensor (bECS) architecture having a single RTD according to an embodiment of the invention.

FIG. 5 depicts a balanced embedded contact sensor (bECS) architecture 500 discussed in the 518 application. The bECS architecture shown in FIG. 5 employs the low noise circuit depicted in FIG. 4, where a first arm of the circuit is comprised within head slider 510 and a second arm of the circuit is comprised within read/write IC 550. The circuit arms of bECS architecture 500 may be arms of a Wheatstone bridge type circuit. FIG. 5 depicts head slider 510 and the relevant elements therein, namely RTD 520 and resistors 522 and 524. RTD 520 has a resistance value of $R_{ECS}$ and resistors 522 and 524 each have a resistance of $R_{SB}$.

RTD 520 may be embodied as a thermistor. RTD 520 may be composed of, but not limited to, metallic (e.g., NiFe) and semiconductor materials. RTD 520 may measure temperature based on the voltage drop associated therewith. Changes in temperature cause a change in the amount of resistance provided by a resistive temperature detector. A small increase in temperature may result in an increase or decrease in voltage across a resistive temperature detector. Thus, the amount of voltage across a resistive temperature detector may be used to identify the temperature associated with the resistive temperature detector.

RTD 520 is located on or proximate to the air bearing surface of head slider 510. When physical contact is made between head slider 510 and the magnetic-recording disk when the magnetic-recording disk is rotating, the resulting friction causes an increase in temperature within head slider 510 originating at the point of contact. The change in temperature resulting from the physical contact will be a gradient as a function of distance from the point of contact. The increase in temperature will cause a measurable change in the voltage across RTD 520.

FIG. 5 also depicts read/write IC 550. Read/write IC 550 comprises balance resistor 530 having a resistance of $R_{BAL}$. Read/write IC 550 also includes resistors 532 and 534 and amplifiers 540 and 542.

The resistance ($R_{SB}$) of each of resistors 522 and 524 is much greater than the resistance ($R_B$) of each of resistors 532 and 534. Resistors 522 and 524 are used to set the voltage for the head slider body 512 to the desired value ($V_{SB}$) by using a feedback loop to control the voltage at the $V_+$ terminal 560 and the $V_-$ terminal 562 (note that the feedback loop is not shown in FIG. 5). Resistors 532 and 534 resistors are used as bias resistors to regulate the current bias along the two arms of the circuit.

The first arm and second arm of the circuit are shown in FIG. 5. Since resistors 522 and 524 have a much greater resistance value than RTD 520, the total value of the resistance from the V+ terminal 560 to the V- terminal 562 along the first arm of the circuit is the resistance value of RTD 520 (which is $R_{ECS}$)+the resistance value of resistor 532 (which is $R_B$). Along the second arm of the circuit, the total value of the resistance from the V+ terminal 560 to the V- terminal 562 is the resistance value of resistor 534 ($R_B$)+the resistance value of balance resistor 530 ($R_{BAL}$). Therefore, by adjusting the resistance $R_{BAL}$ of balance resistor 530, it is possible to balance the bridge circuit (i.e., the first arm and the second arm of the circuit have the same resistance when the circuit is balanced) and remove the baseline signal not related to contact between the head slider and the disk. Unless there is physical contact between head slider 510 and the magnetic-recording disk, the same amount of current will flow through both the first arm and the second arm of the circuit. Only changes in the resistance value of RTD 520 ($R_{ECS}$) will be detected by amplifier 540 to generate a voltage signal that mostly contains contact information. Noise generated by the first arm of the circuit is cancelled out by noise generated by the second arm of the circuit, thereby allowing detection of physical contact between head slider 510 and the disk using a low noise circuit.

The resistance ($R_{BAL}$) of balance resistor 530 is calibrated or configured to be equal to the resistance of RTD 520. In an embodiment, the resistance of balance resistor 530 may be calibrated or configured by setting certain electrical switches to place a portion of a plurality of resistors in series to form balance resistor 530 so that the portion of the plurality of resistors forming balance resistor 530 have the desired resistance, i.e., the amount of assistance of RTD 520 when head slider 510 is not in physical contact with the disk. For example, if the total amount of resistance of balance resistor 530 is determined to be 200 ohms when head slider 510 is not in physical contact with the disk, then certain electrical switches may be configured to place a certain number of resistors in series so that the total amount of resistance of the resistors in series is 200 ohms. The calibration or configuration of balance resistor 530 may be performed once during manufacturing or assembly of the hard-disk drive. Optionally, the hard-disk drive may contain a sensor that detects certain environmental changes, such as a change in altitude, humidity, pressure, or temperature. If the hard-disk drive detects an environmental change that exceeds a certain threshold, then the resistance value of balance resistor 530 may be recalibrated or reconfigured as explained above. In this way, if the hard-disk drive is taken to a new environment that may affect the resistance of RTD 520, the resistance of balance resistor 530 may be updated so that it is equal to the resistance of RTD 520 in the new environment.

In an embodiment, amplifier 542 may optionally be connected directly across the ECS terminals (labeled ECS+ and ECS− in FIG. 5) to measure the absolute resistance of ECS. In this configuration, the noise for contact detection is given by $4 K_B T R_{ECS}$ plus the amplifier noise, where T is temperature and $K_B$ is Boltzmann's constant.

In addition, the embodiment depicted in FIG. 5 enables independent control of the head slider body 512 potential (by adjusting $V_{SB}$) and the bias current through RTD 520 by adjusting current $I_B$. In this way, the voltage level associated with ground at head slider 510 may be higher than the voltage level of ground at the magnetic-recording disk. Advantageously, such independent control enables the interface voltage control (IVC) feature discussed in U.S. patent application Ser. No. 10/691,752 to be on or off regardless of the value of $I_B$ chosen to operate RTD 520.

Another advantage provided by bECS architecture 500 depicted in FIG. 5 over the prior art is that circuit 500 may be embodied using a head slider 510 constructed without requiring any special builds since one RTD is employed within head slider 510.

Figure 6:
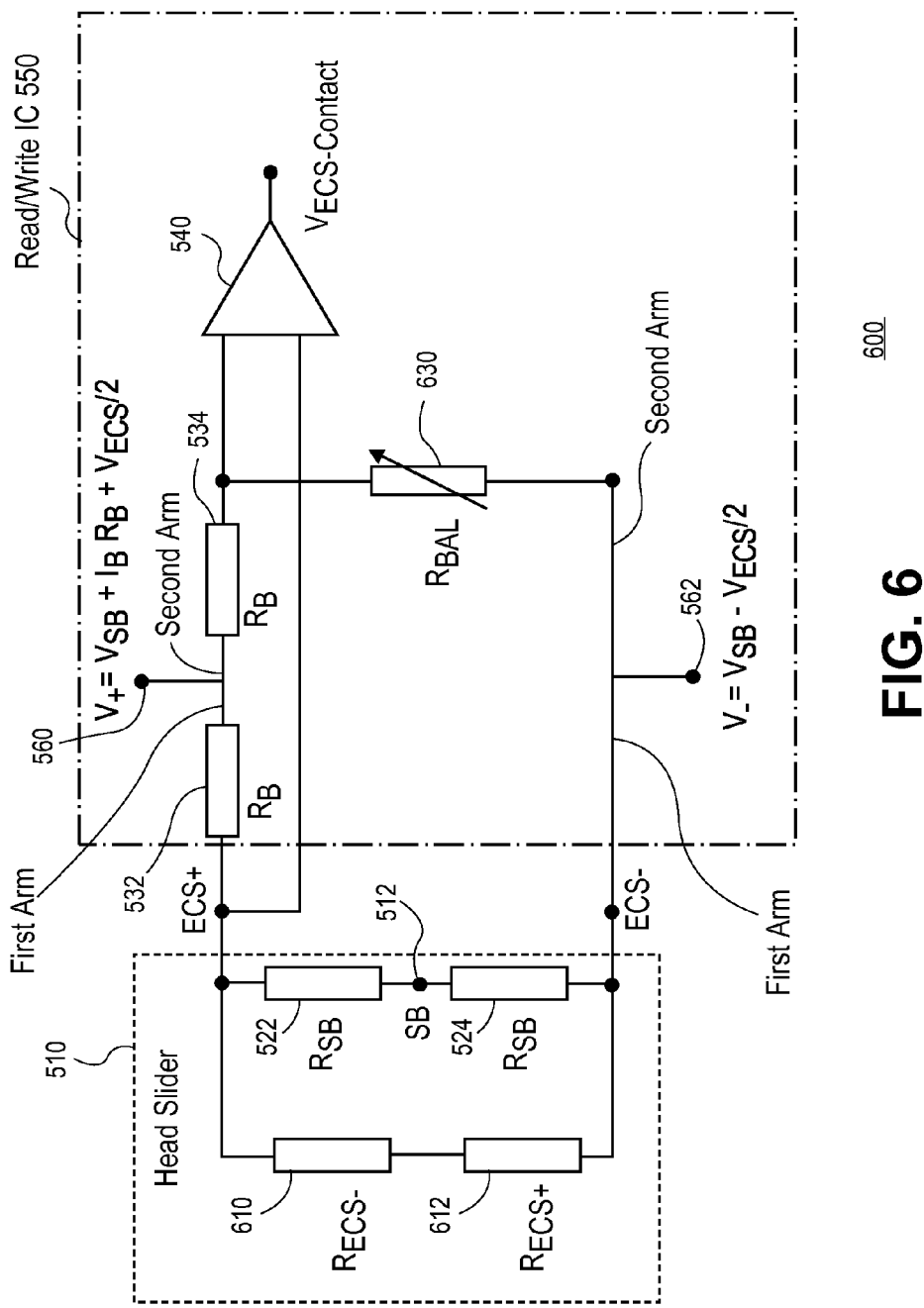
FIG. 6 depicts a balanced embedded contact sensor (bECS) architecture having two RTDs according to another embodiment of the invention.

FIG. 6 depicts a balanced embedded contact sensor (bECS) architecture 600 according to another embodiment discussed in the 518 application. The circuit architecture of FIG. 6 may be that of a Wheatstone bridge type circuit, thus noise generated by the first arm of the circuit may be cancelled out by noise generated by the second arm of the circuit. Unless there is physical contact between head slider 510 and the magnetic-recording disk, the same amount of current will flow through both the first arm and the second arm of the circuit.

The bECS architecture 600 shown in FIG. 6 comprises two RTDs, namely RTD 610 and RTD 612. RTDs 610 and 612 have resistance values $R_{ECS-}$ and $R_{ECS+}$ respectively. RTD 610 is constructed using a material that has an opposite temperature coefficient of resistance (TCR) than the material used to construct RTD 612. Resistor 612 may be placed close to the air bearing surface (ABS) of head slider 510 while resistor 610 is placed well inside of head slider 510, e.g., resistor 610 may be offset from the air bearing surface or embedded within head slider 510. When physical contact is made between head slider 510 and the magnetic-recording disk when the magnetic-recording disk is rotating, the resulting friction causes an increase in temperature within head slider 510 originating at the point of contact. The change in temperature resulting from the physical contact will be a gradient as a function of distance from the point of contact.

Resistor 630, having a resistance of $R_{BAL}$ and residing in read/write IC, is used to cancel the baseline resistance of both RTDs 610 and 612. For example, if RTDs 610 and 612 each have a resistance of 100 ohms, then resistor 630 will have a resistance of 200 ohms.

A change in temperature caused by physical contact between head slider 510 and the magnetic-recording disk will affect resistor 612 more than RTD 610 since RTD 612 is closer to the point of contact. As a result, the resistance of RTD 610 will change by a different magnitude than any change in resistance of RTD 610, since RTD 610 is further away from the point of contact. Therefore, the voltage across the first arm of circuit 600 will be different than the voltage across the second arm of circuit 600 when physical contact is made between head slider 510 and the magnetic-recording disk.

Note that environmental changes, such as a change in temperature, pressure, humidity, or altitude will affect RTDs 610 and 612 equally. Therefore, if the hard-disk drive contains a sensor which detects a change in the environment of the HDD, such as a change in temperature, pressure, humidity, or altitude, then it would not be necessary to recalibrate resistor 630, as the environmental change will have no affect on the total amount of resistance of RTD 610 and 612. This is so because any change in resistance in one of RTD 610 and 612 caused by such an environmental change will be cancelled out by an opposite change in resistance by the other of RTD 610 and 612.

Any common mode temperature changes will be partially cancelled since RTD 610 and 612 will vary in opposite directions with any ambient (non-contact related) temperature change. bECS architecture 600 shown in FIG. 6 offers the same noise advantages as the embodiment depicted in FIG. 5, but provides better cancellation of thermal signatures not related to contact between head slider 510 and the magnetic-recording disk. The bECS architecture 600 shown in FIG. 6. also allows independent control of interface voltage control (IVC) and embedded contact sensors (ECS), but it does not allow absolute slider temperature measurements and requires special slider builds since two RTDs are employed within head slider 510.

The architectures depicted in both FIG. 5 and FIG. 6 may both include an auto-zeroing power up and/or periodic calibration to zero-out the amplifier's input voltage.

Thermoelectric Voltage-Based Differential Contact Sensor (tECS)

Thermoelectric voltage (TEV) is produced by a temperature gradient within a conductor. TEV may be measured when connecting two metals having different Seebeck coefficients, as in the case of thermocouples.

Figure 7:
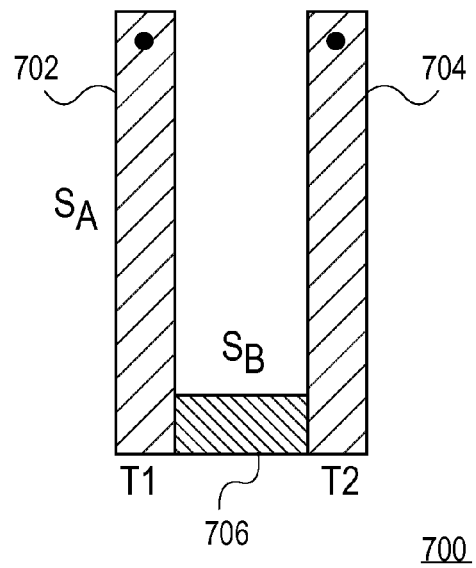
FIG. 7 depicts a thermoelectric sensor comprised of two metal junctions which may be used to measure TEV according to an embodiment of the invention.

FIG. 7 depicts a thermoelectric sensor 700 comprised of two metal junctions which may be used to measure TEV according to an embodiment of the invention. The distance between the slider and the disk affects the temperature of the slider. Sensor 700 may measure temperature in the slider to measure the distance between the slider and the disk. Thermoelectric sensors may be abbreviated herein as tECS.

FIG. 7 will be used to describe how an embodiment operates. Sensor 700 comprises conductive leads 702 and 704 and metallic strip 706. Conductive leads 702 and 704 are made from the same material, and thus, have the same Seebeck coefficient. The material from which conductive leads 702 and 704 are made has a different Seebeck coefficient as metallic strip 706.

Metallic strip 706 may be comprised of a variety of different suitable materials. Metallic strip 706 may be constructed using a material which assists in increasing signal level. Nonlimiting examples of materials in which metallic strip 706 may be comprised of include chromel-constantan 68 uV/° C., chromel-alumel 41 uV/° C., copper-constantan 40 uV/° C., iron-constantan 51 uV/° C., and Ni—Cr—Si/Ni—Si 39 uV/° C.

Metallic strip 706 is subject to a temperature gradient T1–T2. The thermoelectric voltage (TEV) is given by TEV= $(S_A-S_B)*(T1-T2)$, where $S_A$ is the Seebeck coefficient of conductive leads 702 and 704 and $S_B$ is the Seebeck coefficient of metallic strip 706. Note that TEV depends only on the temperature difference between the two junctions (i.e., the junction between metallic strip 706 with both of conductive leads 702 and 704). In this way, sensor 700 operates as a differential temperature sensor.

Furthermore, sensor 700 does not require any current or voltage to operate. Thus, the absence of current through sensor 700 implies no sensor heating, and therefore, no sensor protrusion. In sharp contrast, prior art contact sensors, including those discussed in the 518 application and the 565 application, experience sensor protrusion due to heating of the sensor. Also, TEV is intrinsically differential, so measuring TEV can effectively compensate for uniform slider heating due to TFC, writer, assisted recording products (such as heating the disk through various means, such as a laser), and radiation heating. As sensor 700 requires only two leads (i.e., conductive leads 702 and 704), sensor 700 is completely compatible with the interface voltage control (IVC) feature discussed in U.S. patent application Ser. No. 10/691,752.

Figure 8A:
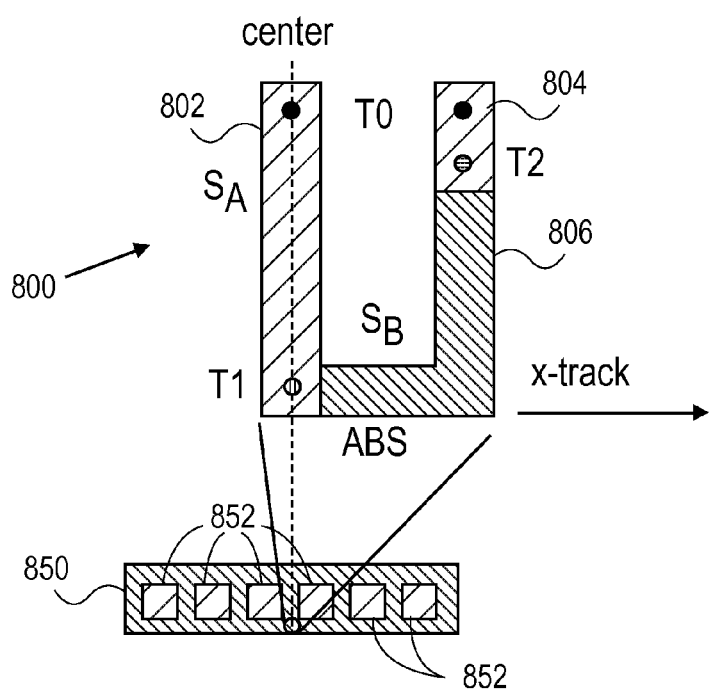
FIG. 8A is an illustration of a thermoelectric sensor and a face of a slider according to a first embodiment of the invention.
Figure 8B:
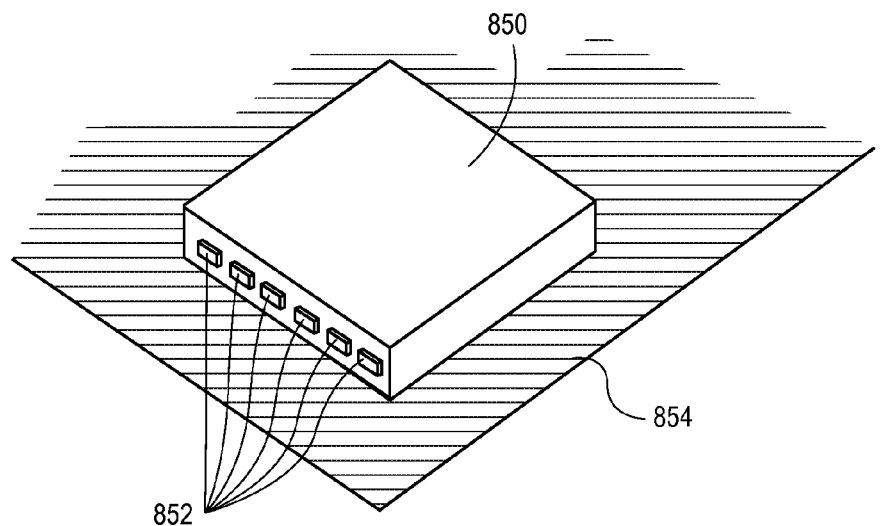
FIG. 8B is a perspective view of a slider and the disk according to an embodiment of the invention.
Figure 8C:
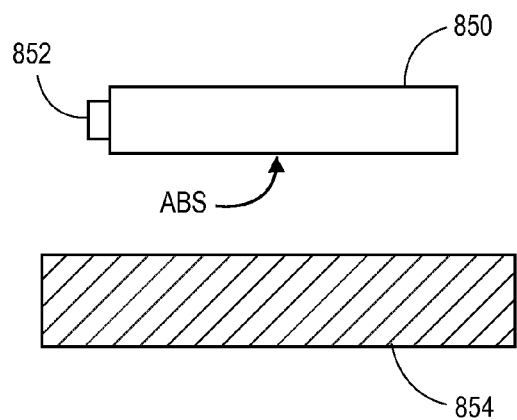
FIG. 8C is a side view of the slider and the disk according to an embodiment of the invention.

Sensor 700 may be implemented in a variety of different manners according to various embodiments of the invention. To illustrate one embodiment, FIG. 8A is an illustration of thermoelectric sensor 800 and slider 850 according to a first embodiment of the invention. FIG. 8A depicts a face of slider 850 on which electronic contact pads 852 of slider 850 reside. Electronic contact pads 852 are in electrical contact with suspension pads (not shown) on the suspension. To better appreciate the location of the face of slider 850 depicted in FIG. 8A, FIG. 8B is a view of slider 850 and the surface of disk 854 according to an embodiment of the invention. FIG. 8C is a side view of slider 850 in relation to the surface of disk 854 according to an embodiment. FIG. 8C depicts the air bearing surface (ABS) of slider 850 relative to disk 854.

As shown in FIG. 8A, the junction between conductive lead 802 and metallic strip 806 is associated with temperature T1 and may be located at the center of slider 850 in the same axis as the writer. The junction between conductive lead 804 and metallic strip 806 is associated with temperature T2 and may be located in a cross track direction and recessed away from the air bearing surface (ABS). Thus, while the junction between conductive lead 802 and metallic strip 806 may be located at or near the ABS, the junction between conductive lead 804 and metallic strip 806 may be recessed or disposed away from the ABS in the embodiment of FIG. 8A.

Figure 9:
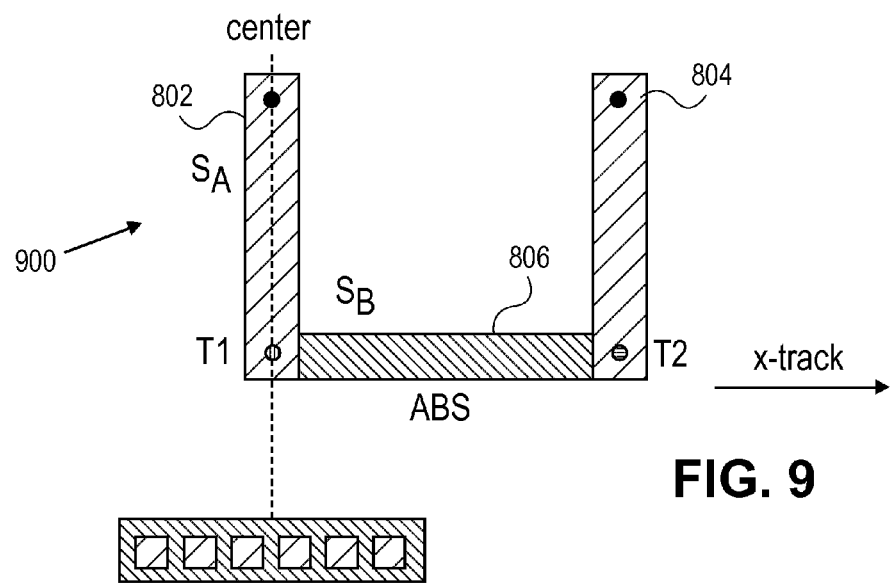
FIG. 9 is an illustration of a thermoelectric sensor according to a second embodiment of the invention.

FIG. 9 is an illustration of thermoelectric sensor 900 according to a second embodiment of the invention. Thermoelectric sensor 900 is similar to thermoelectric sensor 800, except that the junction between metallic strip 806 and conductive lead 804 is located at or very close to the ABS in a cross track direction from the junction between metallic strip 806 and conductive lead 802. The temperature difference between conductive lead 804 and metallic strip 806 is dominated by heating and cooling as the head-disk spacing changes.

Figure 10:
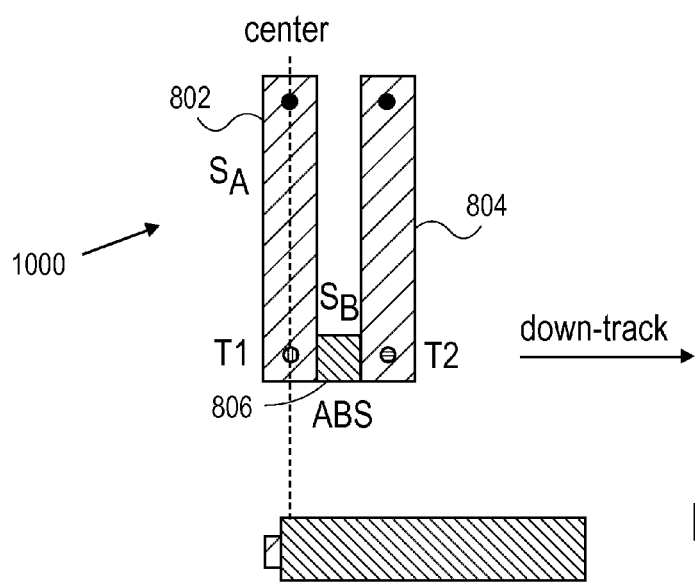
FIG. 10 is an illustration of a thermoelectric sensor according to a third embodiment of the invention.

FIG. 10 is an illustration of thermoelectric sensor 1000 according to a third embodiment of the invention. Thermoelectric sensor 1000 comprises two junctions (the junctions between metallic strip 806 and conductive leads 802 and 804) that are both located at or near the ABS and both located on the same axis as the writer. However, the junction between metallic strip 806 and conductive lead 804 is located further down or further up the same track and may be used to measure disk temperature gradients in the writing direction. The design of thermoelectric sensor 1000 is particularly useful in conjunction with assisted recording (AR).

Figure 11:
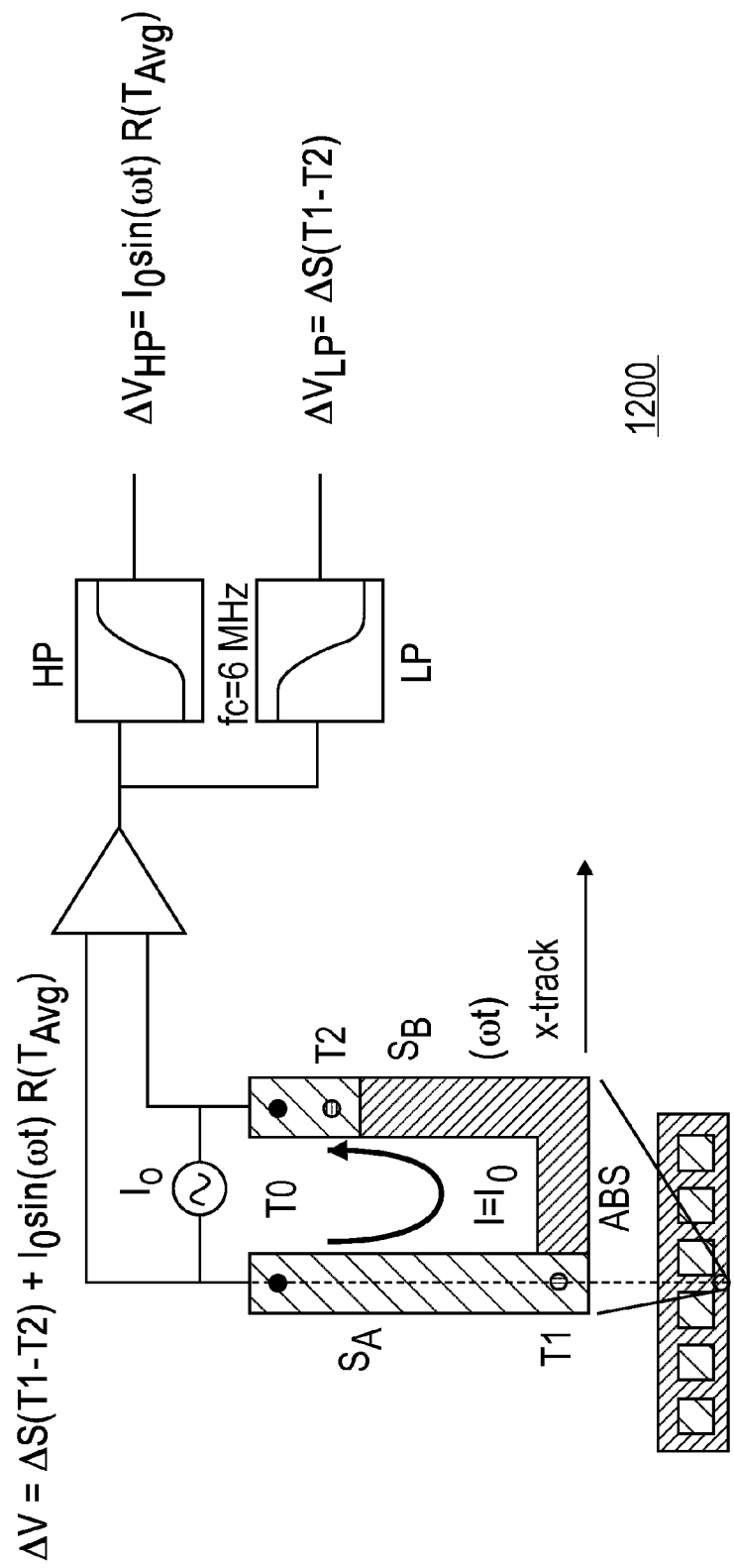
FIG. 11 is an illustration of a first circuit employing a tECS according to an embodiment of the invention.

FIG. 11 is an illustration of circuit 1200 employing a tECS according to an embodiment of the invention. Circuit 1200 may be used to simultaneously measure the temperature difference and the average temperature $T_{avg}$. An AC current applied to the tECS produces an AC voltage proportional to the average sensor resistance, which itself depends on the average sensor temperature and the TCR. In addition to this voltage signal, there is a DC voltage due to the tECS which is proportional to T1–T2. A set of filters may be used to separate the signal into its low and high frequency components. In reality, due to fly height modulation and other effects, the slider temperature is not constant. Relevant temperature variations correspond to signals below 1 MHz, and thus, the low pass (LP) filter will sense variations in temperature that correspond to changes up to 1 MHz, whereas the high pass (HP) filter will sense variations in the average temperature $T_{avg}$ up-converted to a 1 MHz band around the carrier frequency w.

Figure 12:
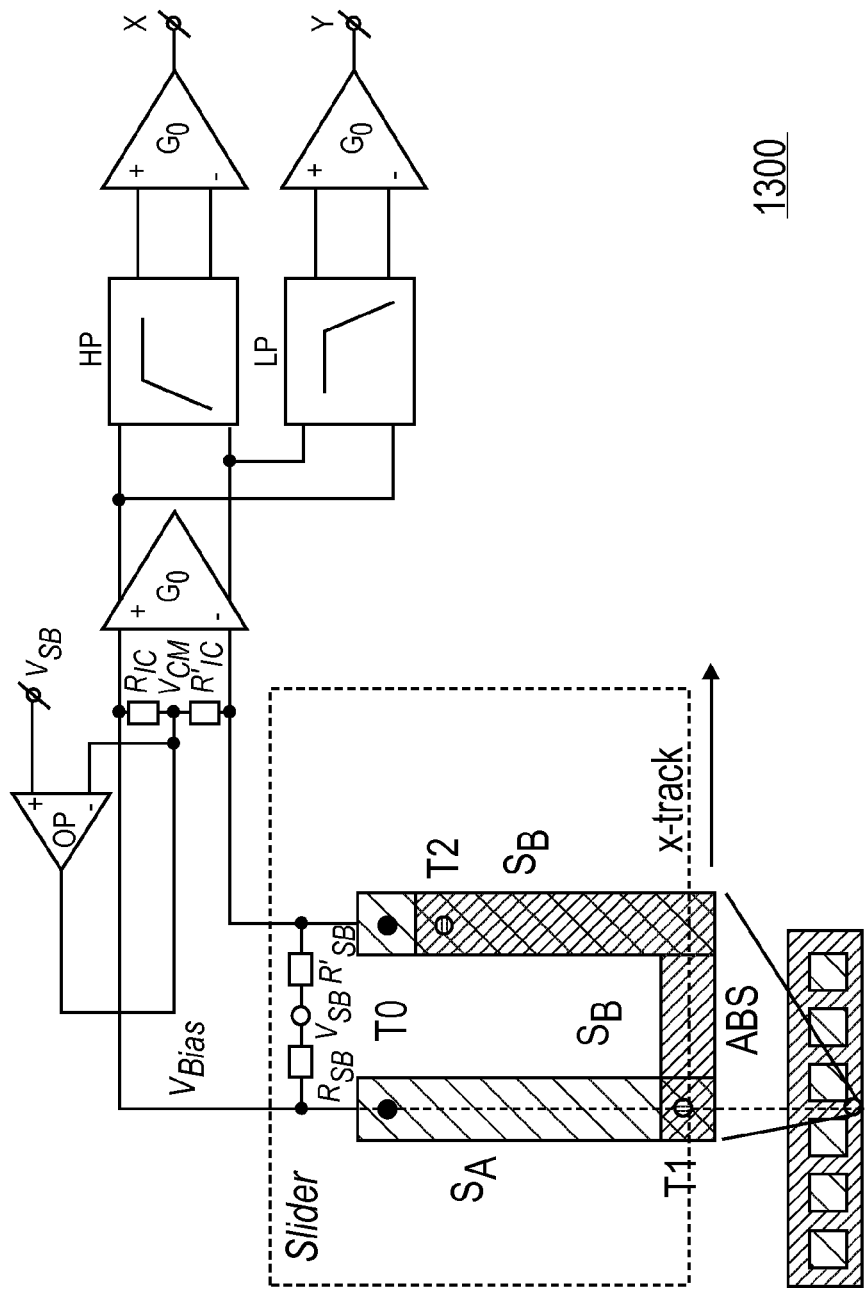
FIG. 12 is an illustration of a second circuit employing a tECS according to an embodiment of the invention.

Utilizing TEV transducers allows independent Interface Voltage Control (IVC) because the TEV transducers do not require a third lead to differentially sense temperature changes. FIG. 12 is an illustration of circuit 1300 employing a tECS according to an embodiment of the invention. Circuit 1300 has a common-mode sense-and-control of voltage node $V_{cm}$. The common-mode of the input of amplifier $G_0$ is accomplished by a voltage-follower configuration with operational amplifier OP. The matching resistor pair, $R_{IC}$ and $R'_{IC}$, are used to sense the common-mode input of amplifier $G_0$. By controlling the common-mode voltage of the input of amplifier $G_0$, the slider potential $V_{SB}$ is then controlled through matching resistor pair, $R_{SB}$ and $R'_{SB}$, by following the voltage $V_{cm}$. As mentioned in the 518 application, IVC allows to set the slider's potential to the contact potential of the slider/media, thereby reducing and/or eliminating the exchange of material or wear.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
a head slider comprising a thermoelectric embedded contact sensor;
a magnetic-recording disk rotatably mounted on a spindle; and
a voice coil motor configured to move the head slider to access portions of said magnetic-recording disk,
wherein the thermoelectric embedded contact sensor comprises a first conductive lead, a second conductive lead, and a metallic component, wherein the metallic component has a different Seebeck coefficient than the first and second conductive leads, and wherein the thermoelectric embedded contact sensor is configured to measure the distance between the head slider and the magnetic-recording disk without a supply of a electrical current from the hard-disk drive.

2. The hard-disk drive of claim 1, wherein the first conductive lead and the second conductive lead are both at or near an air bearing surface of the head slider.

3. The hard-disk drive of claim 1, wherein the first conductive lead is at or near an air bearing surface of the head slider, and wherein the second conductive lead is recessed away from the air bearing surface of the head slider.

4. The hard-disk drive of claim 1, wherein both the first conductive lead and the second conductive lead are positioned in the center of the head slider in the same axis as a writer element.

5. The hard-disk drive of claim 1, wherein the first conductive lead is positioned in the center of the head slider in the same axis as a writer element, and wherein the second conductive lead is positioned in a cross-track direction in relative to the first conductive lead.

6. The hard-disk drive of claim 1, wherein the thermoelectric embedded contact sensor does not have an electrical connection to ground.

7. The hard-disk drive of claim 1, wherein the thermoelectric embedded contact sensor is coupled to a high pass filter to measure variations in the average temperature.

8. The hard-disk drive of claim 1, wherein the thermoelectric embedded contact sensor is coupled to a low pass filter to measure variations in temperature that correspond to changes up to 1 MHz.

9. A thermoelectric embedded contact sensor for use within a hard-disk drive, comprising:
   a first conductive lead;
   a second conductive lead; and
   and a metallic component, wherein the metallic component has a different Seebeck coefficient than the first and second conductive leads, and wherein a thermoelectric voltage across the metallic component is used to measure the distance between a head slider and a magnetic-recording disk without a supply of a electrical current from a hard-disk drive to either of the first conductive lead or the second conductive lead.

10. The thermoelectric embedded contact sensor of claim 9, wherein the first conductive lead and the second conductive lead are both at or near an air bearing surface of the head slider.

11. The thermoelectric embedded contact sensor of claim 9, wherein the first conductive lead is at or near an air bearing surface of the head slider, and wherein the second conductive lead is recessed away from the air bearing surface of the head slider.

12. The thermoelectric embedded contact sensor of claim 9, wherein both the first conductive lead and the second conductive lead are positioned in the center of the head slider in the same axis as a writer element.

13. The thermoelectric embedded contact sensor of claim 9, wherein the first conductive lead is positioned in the center of the head slider in the same axis as a writer element, and wherein the second conductive lead is positioned in a cross-track direction relative to the first conductive lead.

14. The thermoelectric embedded contact sensor of claim 9, wherein the thermoelectric embedded contact sensor does not have an electrical connection to ground.

15. The thermoelectric embedded contact sensor of claim 9, wherein the thermoelectric embedded contact sensor is coupled to a high pass filter to measure variations in the average temperature.

16. The thermoelectric embedded contact sensor of claim 9, wherein the thermoelectric embedded contact sensor is coupled to a low pass filter to measure variations in temperature that correspond to changes up to 1 MHz.

* * * * *